US008101001B2

(12) United States Patent
Qian

(10) Patent No.: US 8,101,001 B2
(45) Date of Patent: Jan. 24, 2012

(54) CYCLONE SEPARATING DEVICE OF A CLEANER

(76) Inventor: Dongqi Qian, Suzhou (CN)

( * ) Notice: Subject to any disclaimer, the term of this patent is extended or adjusted under 35 U.S.C. 154(b) by 389 days.

(21) Appl. No.: 12/083,312

(22) PCT Filed: Oct. 9, 2006

(86) PCT No.: PCT/CN2006/002634

§ 371 (c)(1), (2), (4) Date: Apr. 3, 2009

(87) PCT Pub. No.: WO2007/041947

PCT Pub. Date: Apr. 19, 2007

(65) Prior Publication Data

US 2009/0320421 A1 Dec. 31, 2009

(30) Foreign Application Priority Data

Oct. 9, 2005 (CN) .......................... 2005 1 0094766
Oct. 11, 2005 (CN) .......................... 2005 1 0119889

(51) Int. Cl.
*B01D 45/00* (2006.01)

(52) U.S. Cl. ................ 55/441; 55/343; 55/345; 55/346; 55/424; 55/426; 55/428; 55/429; 15/353

(58) Field of Classification Search .................... 55/343, 55/345, 346, 424, 426, 428, DIG. 3; 15/352, 15/353
See application file for complete search history.

(56) References Cited

U.S. PATENT DOCUMENTS

| | | | | |
|---|---|---|---|---|
| 2,553,175 | A * | 5/1951 | Davenport et al. | 55/343 |
| 3,425,192 | A * | 2/1969 | Davis | 55/345 |
| 4,373,228 | A | 2/1983 | Dyson | |
| 6,572,668 | B1 * | 6/2003 | An et al. | 55/428 |
| 6,582,489 | B2 * | 6/2003 | Conrad | 55/337 |
| 6,607,572 | B2 * | 8/2003 | Gammack et al. | 55/343 |
| 6,746,500 | B1 * | 6/2004 | Park et al. | 55/343 |
| 6,835,222 | B2 * | 12/2004 | Gammack | 55/345 |
| 7,326,268 | B2 * | 2/2008 | Oh et al. | 55/343 |
| 7,438,737 | B2 * | 10/2008 | Song et al. | 55/343 |
| 7,470,299 | B2 * | 12/2008 | Han et al. | 55/345 |
| 7,691,161 | B2 * | 4/2010 | Oh et al. | 55/337 |
| 2004/0068827 | A1 * | 4/2004 | Dyson | 15/353 |
| 2004/0088956 | A1 * | 5/2004 | Gammack | 55/346 |
| 2005/0252179 | A1 * | 11/2005 | Oh et al. | 55/337 |
| 2006/0048487 | A1 * | 3/2006 | Song et al. | 55/343 |
| 2009/0031524 | A1 * | 2/2009 | Courtney et al. | 15/347 |
| 2010/0000185 | A1 * | 1/2010 | Hyun et al. | 55/343 |

FOREIGN PATENT DOCUMENTS

| | | |
|---|---|---|
| CN | 1606952 A | 4/2005 |
| CN | 1611177 A | 5/2005 |
| CN | 1316934 C | 5/2007 |
| WO | WO 01/60226 A1 | 8/2001 |

* cited by examiner

OTHER PUBLICATIONS

International Search Report dated Feb. 1, 2007 issued in PCT/CN2006/002634 w/ English translation.

*Primary Examiner* — Jason M Greene
*Assistant Examiner* — Dung H Bui
(74) *Attorney, Agent, or Firm* — Venable LLP; Robert Kinberg; Leigh D. Thelen

(57) ABSTRACT

A cyclone separating device of a cleaner includes an upstream cyclone separating device and a downstream cyclone separating device. The upstream separating device communicates with the downstream cyclone separating device through a gas passage. The upstream cyclone separating device has a first cyclone barrel, while the downstream cyclone separating device has at least one second cyclone barrel. The downstream cyclone separating device is lying and set above the upstream separating device. The size of the cyclone separating device of the present invention is small in radial direction. The height of the cyclone separating device which is the sum of the height of the upstream cyclone separating device plus the height of the lying downstream cyclone separating device lying down is low.

14 Claims, 7 Drawing Sheets

C-C

CYCLONE SEPARATING DEVICE OF A CLEANER

FIELD OF THE INVENTION

The present invention relates to a device for extracting solid from fluid body, and particularly to a cyclone separating device of a cleaner for separating dust and other dirt from airflow.

BACKGROUND OF THE INVENTION

Cyclone separating devices can be used to separate dust and other dirt from airflow by virtue of the centrifugal force produced by a highly revolving flow in the cyclone barrel. In the prior art, two-leveled cyclone separating devices are adopted in a serial, so that big sized dust can be extracted from the dust laden air firstly through an upstream separating device, then small dust particles are eliminated through a downstream separating device, which finally attains the purpose of purifying the air.

However, an obvious disadvantage of the known art mentioned above is its bulky size, which causes great trouble to the device operator. Besides, the long gas passageway between the two cyclone separating devices results in a complicated manufacturing process, which means more components and a higher production cost.

In an intention to solve the above mentioned problems, the U.S. Pat. No. 4,373,228 came up with a vacuum cleaning appliance with the downstream separating device partially mounted inside the upstream separating device. However, new problems come up. On one hand, the cyclone separating device must be cylindrical in shape; also, the radial dimension of the whole device must be very large due to the insertion of the downstream separating device inside the upstream separating device. The CN 2004100049368.3 patent disclosed another separating device with the downstream separating device mounted at the outside of the upstream separating device. Such designed device lowers its height to some extent, but is still large in radial direction, and thus finds no application in many cases.

SUMMARY OF THE INVENTION

Accordingly, the object of the present invention is to provide a compact cyclone separating device of a cleaner.

In order to achieve the object set forth, we adopt the following scheme:

A cyclone separating device of a cleaner comprises an upstream separating device having a first cyclone barrel, and a downstream cyclone separating device communicating with the upstream separating device through a gas passage, the downstream separating device having at least one second cyclone barrel. The downstream separating device is recumbently and wholly mounted above the upstream separating device.

The first cyclone barrel possesses a first axis. The second cyclone barrel possesses a second axis. Between the first axis and second axis a spatial angle is formed, and the angle is in the range of 15 to 165 degree.

Said angle between the first angle and the second angle ranges preferably from 20 to 160 degree. The best mode lies in that the axis of the first barrel is substantially perpendicular to that of the second barrel. Also the angle between the axis of the second cyclone barrel and that of the first cyclone barrel is in the range of 120 to 145 degree.

The first cyclone barrel is formed with a first suction mouth in its sidewall and a filter mesh inside. The filter mesh is cylindrically or conically shaped and coaxial to the first cyclone barrel.

A dust barrel is coaxially set inside the first cyclone barrel.

The second cyclone barrel is formed with a dust outlet communicating with the dust barrel.

The axes of the second cyclone barrel are substantially intersected at one point which is substantially on the axis of the first cyclone barrel.

The axes of all the second cyclone barrels are substantially coplanar.

A skirt brim having a plurality of filtering pores is mounted inside the first barrel. The skirt brim is coaxial to the dust barrel and surrounding the outer surface of the dust barrel.

The downstream separating device includes a plurality of paratactic cyclone barrels.

Compared with the prior art, the present invention has advantages as follows:

With the height of the present invention being the sum of the height of the upstream separating device plus the height of the recumbent downstream separating device, the cyclone separating device is not only smaller in radial dimension but also lower in height.

Figure 1:
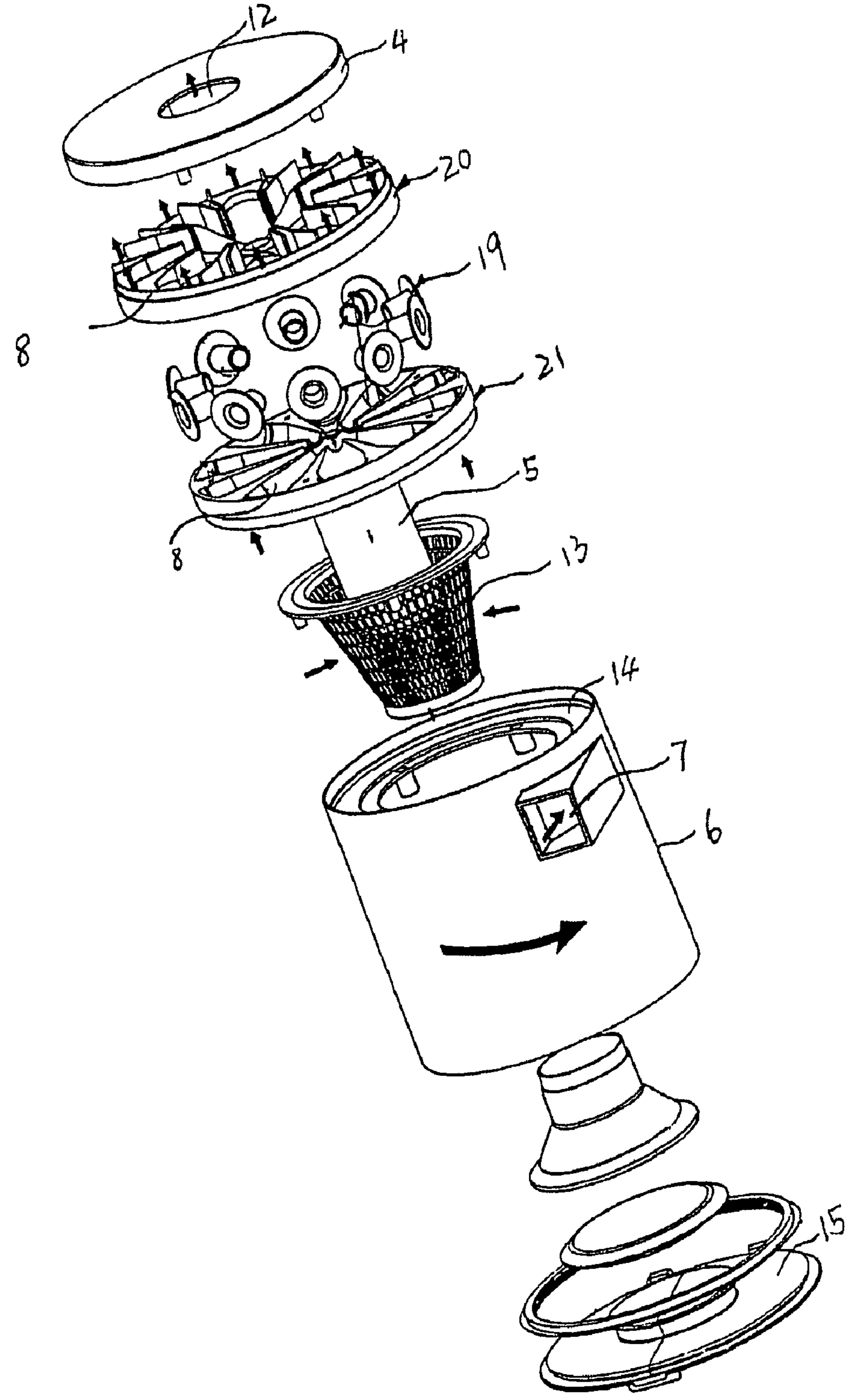
FIG. 1 is an explosive perspective view of the present invention.
Figure 2:
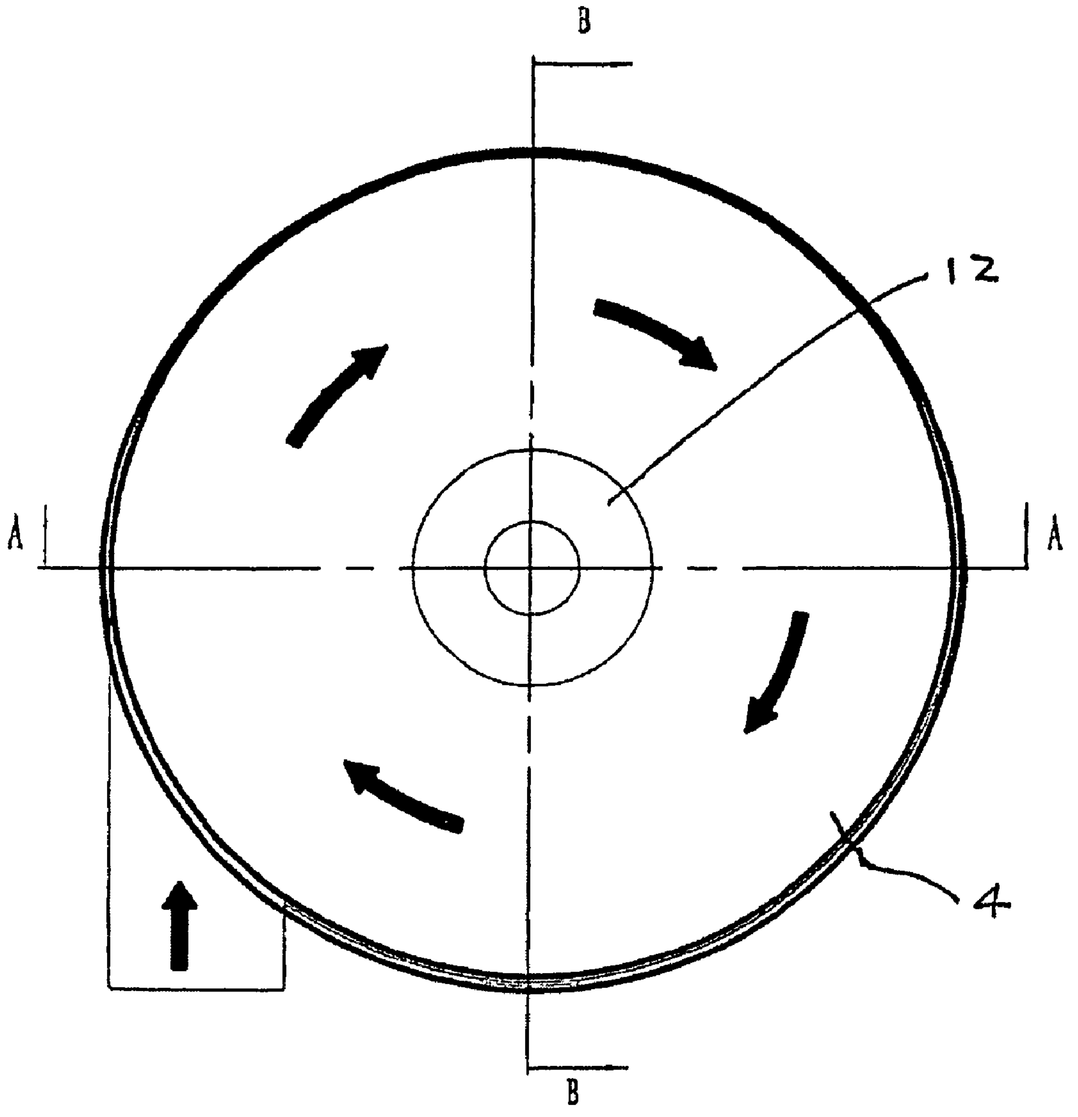
FIG. 2 is a top view of the present invention.

Wherein:

1. upstream cyclone separating device;
2. downstream cyclone separating device;
3. gas passage;
4. coping;
5. dust barrel;
6. first cyclone barrel;
7. first suction mouth;
8. second cyclone barrel;
9. second suction mouth;
10. dust outlet;
12. gas outlet;
13. filter mesh;
14. clapboard;
15. bottom lid;
16. dust chamber;
17. axis;
18. axis;
19. leading conduit;
20. upper module;
21. lower module;
1'. upstream cyclone separating device;
2'. downstream cyclone separating device;
3'. gas passage;
4'. coping;
5'. dust barrel;
6'. first cyclone barrel;
7'. first suction mouth;

8'. second cyclone barrel;
9'. second mouth;
10'. gas outlet;
11'. dust outlet;
12'. gas inlet;
13'. filter net;
15'. bottom lid;
17'. axis;
18'. axis;
19'. leading conduit;
22'. skirt brim;
23'. filtering pore; and
24'. bottom sealed ring are all shown.

DETAILED DESCRIPTION OF THE PREFERRED EMBODIMENTS

The First Embodiment

With reference to FIG. 1 to FIG. 5, the cyclone separating device according to this embodiment includes an upstream cyclone separating device 1, a downstream cyclone separating device 2 and a gas passage 3 therebetween connecting the upstream cyclone separating device 1 and the downstream cyclone separating device 2 so that they are communicated with each other.

The upstream cyclone separating device 1 has a first cyclone barrel 6 and the down cyclone separating device 2 has ten second cyclone barrels 8 with several of second cyclones 8' coordinately set. The whole downstream cyclone separating device 2 sleeps above the upstream cyclone separating device 1 recumbently. The axis 17 of the second cyclone barrel 8 is cornered with the axis 18 of the first cyclone 6 to form an angle α. The downstream cyclone separating device 2 is substantially lying down when the angle is in the range from 75 to 125 degree.

The angle α is 90 degree in the present embodiment. The sidewall of the first cyclone barrel 6 is formed with a first suction mouth 7 through which the dust laden gas entering the first cyclone barrel 6 with a cylindrical or conical shaped filter mesh 13 coaxially set inside. The first suction mouth 7 is set tangentially to the inner sidewall of the first cyclone barrel 6, so that the gas enters the first suction mouth 7 in a tangential direction about the sidewall of the first cyclone barrel 6 to form a vortex inside the upstream cyclone separating device 1. The filter mesh 13 is located at the center of the first cyclone barrel 6 and its upper end is connected with the top wall of the first cyclone barrel 6 through a clapboard 14. A dust barrel 5 can also be set inside the first cyclone barrel 6, which extends between the bottom of the upstream cyclone separating device 1 and the dust outlet 11 of the downstream cyclone separating device 2 and engages tightly with the inner sidewall of the filter mesh 13. After passing through the filter 13, the gas further passes through the gas passage 3 and enters each downstream cyclone separating device 2.

An upper module 20 and a lower module 21 are interlocked to form the downstream cyclone separating device 2, which can further includes a leading conduit 19.

The second cyclone barrel 8 is formed with a second suction mouth 9, a gas outlet 10 and a dust outlet 11 lying above the dust barrel 5, the gas sucked by the second suction mouth 9 entering the second cyclone barrel 8 tangentially, the gas outlet 10 lying at the outer nozzle of the leading conduit 19. Each of the second suction mouth 9 communicates with the gas passage 3, so that the gas enters each of the second cyclone barrel 8 through the second suction mouth 9 after flowing out of the gas passage 3, then passes through the cavity of the conduit 19, and finally vents out from the gas outlet 10, while the dust separated falls into the dust barrel 5 through the dust outlet 11.

Figure 3:
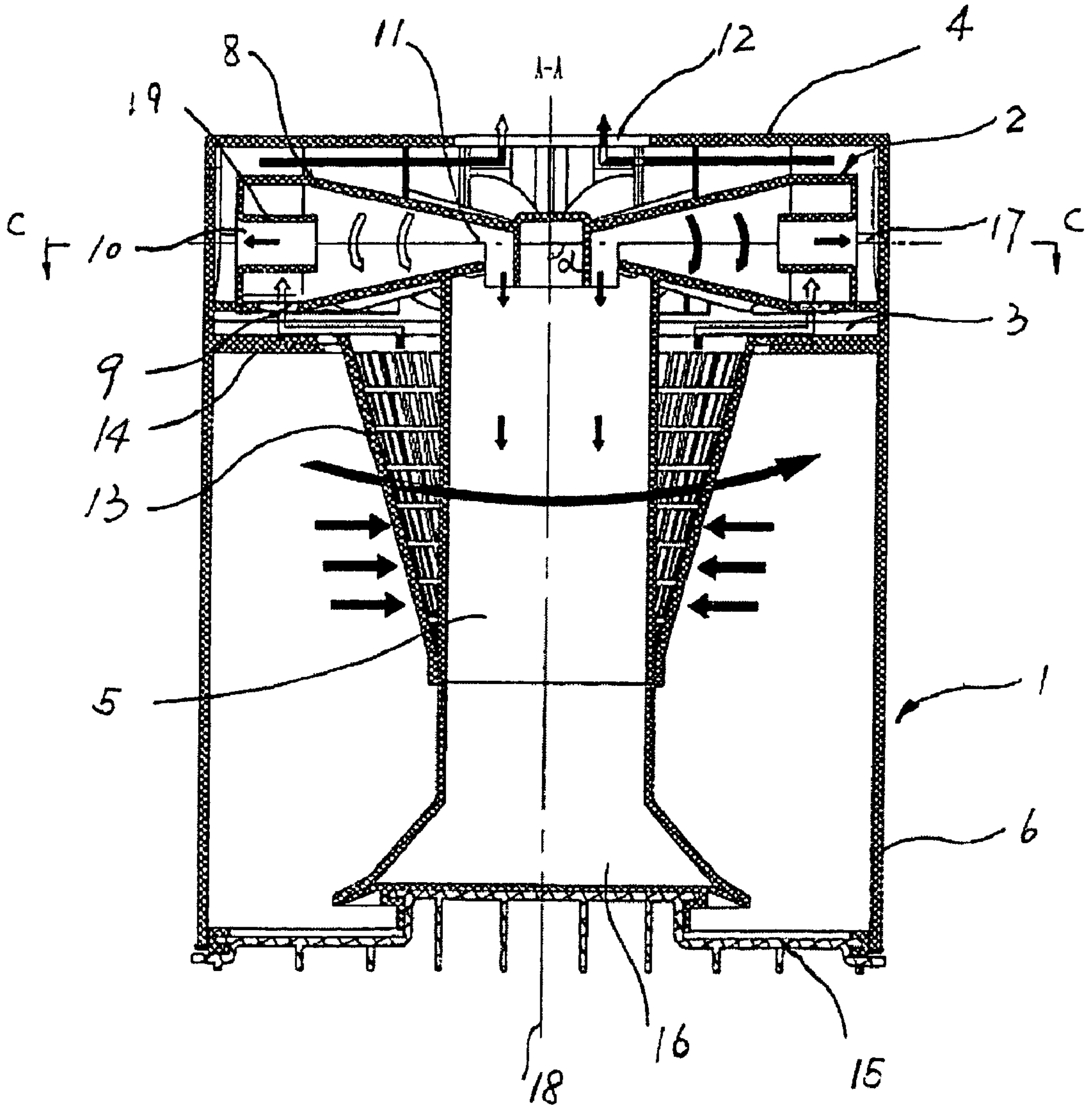
FIG. 3 is the sectional view of FIG. 2 taken along A-A direction.
Figure 4:
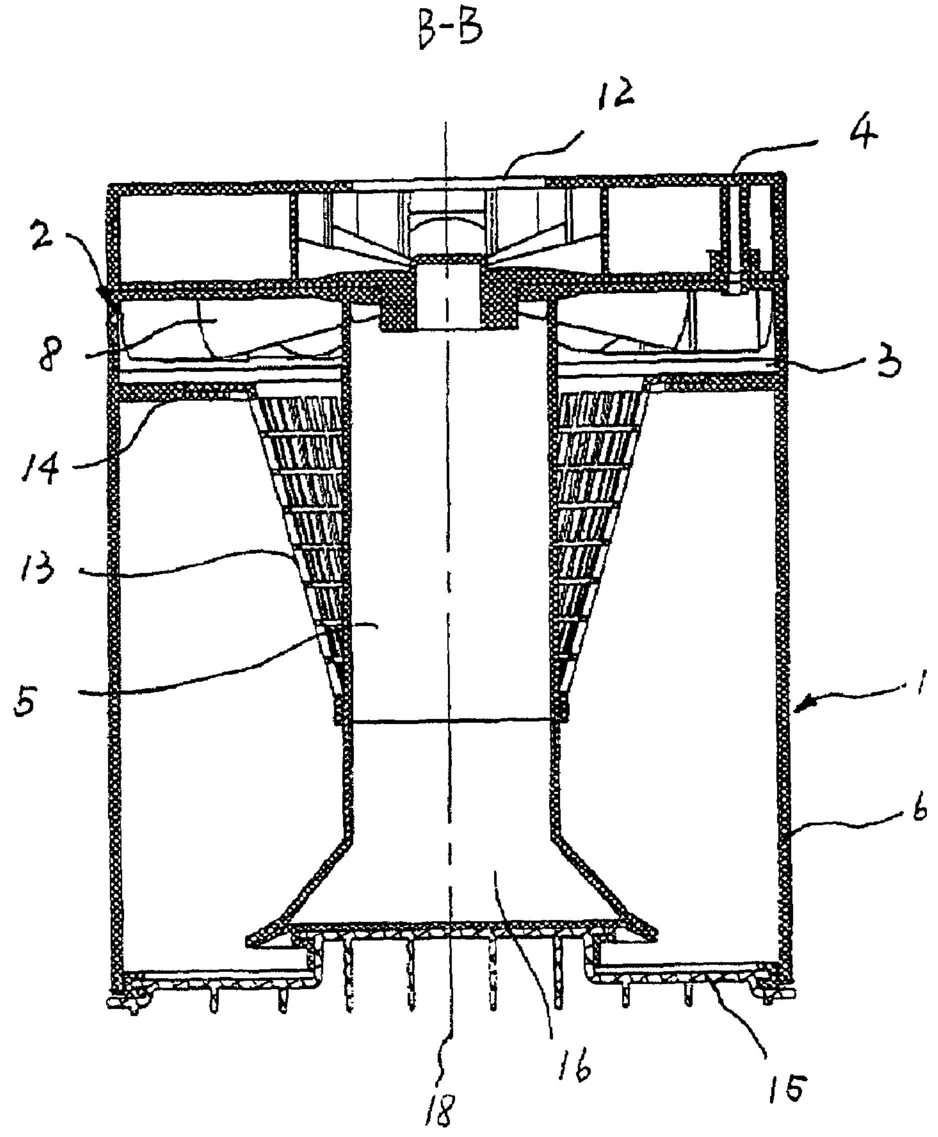
FIG. 4 is the sectional view of FIG. 2 taken along B-B direction.
Figure 5:
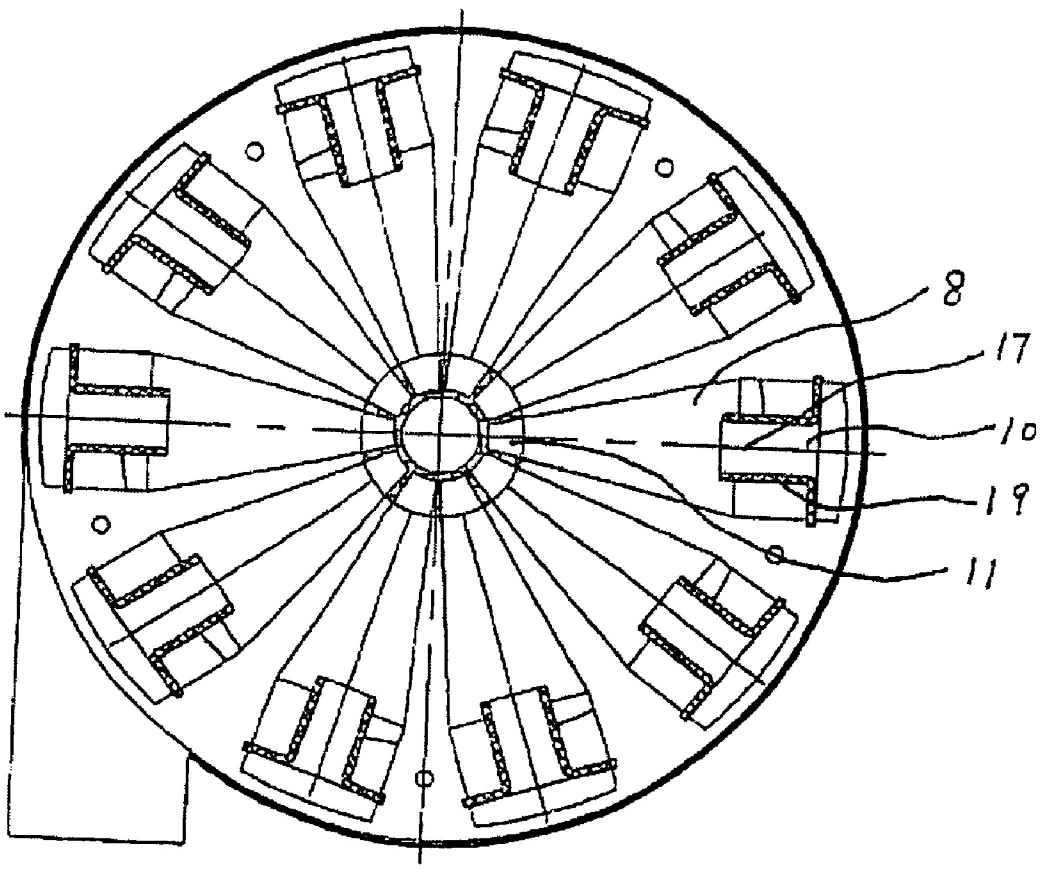
FIG. 5 is the sectional view of FIG. 3 taken along C-C direction.

As shown in FIG. 5, the axes of all second cyclone barrels 8 intersect at one point belonging to the axis 18 of the first cyclone barrel 6. Refer to FIG. 3, the axes of each second cyclone barrel 8 are in the same plane and perpendicular to the axis 18 of the first cyclone barrel 6 with each second cyclone barrel 8 projecting from one point. Such a design can minimize the height of the whole device.

The upside of the downstream cyclone separating device 2 can further be covered with a coping 4 having a gas outlet 12, through which the purified gas from the second cyclone barrels 8 flows out of the cyclone separating device and then enters into space with pressure lower than that of the atmosphere. The upper module 20 can be fixed on the coping 4 by a bolt or any other feasible means.

At the underside of the upstream cyclone separating device 1 a bottom lid 15 which is formed with a dust chamber 16 at the position opposite to the dust barrel 5 for collection of the dust in dust barrel 5 is set.

The Second Embodiment

Figure 6:
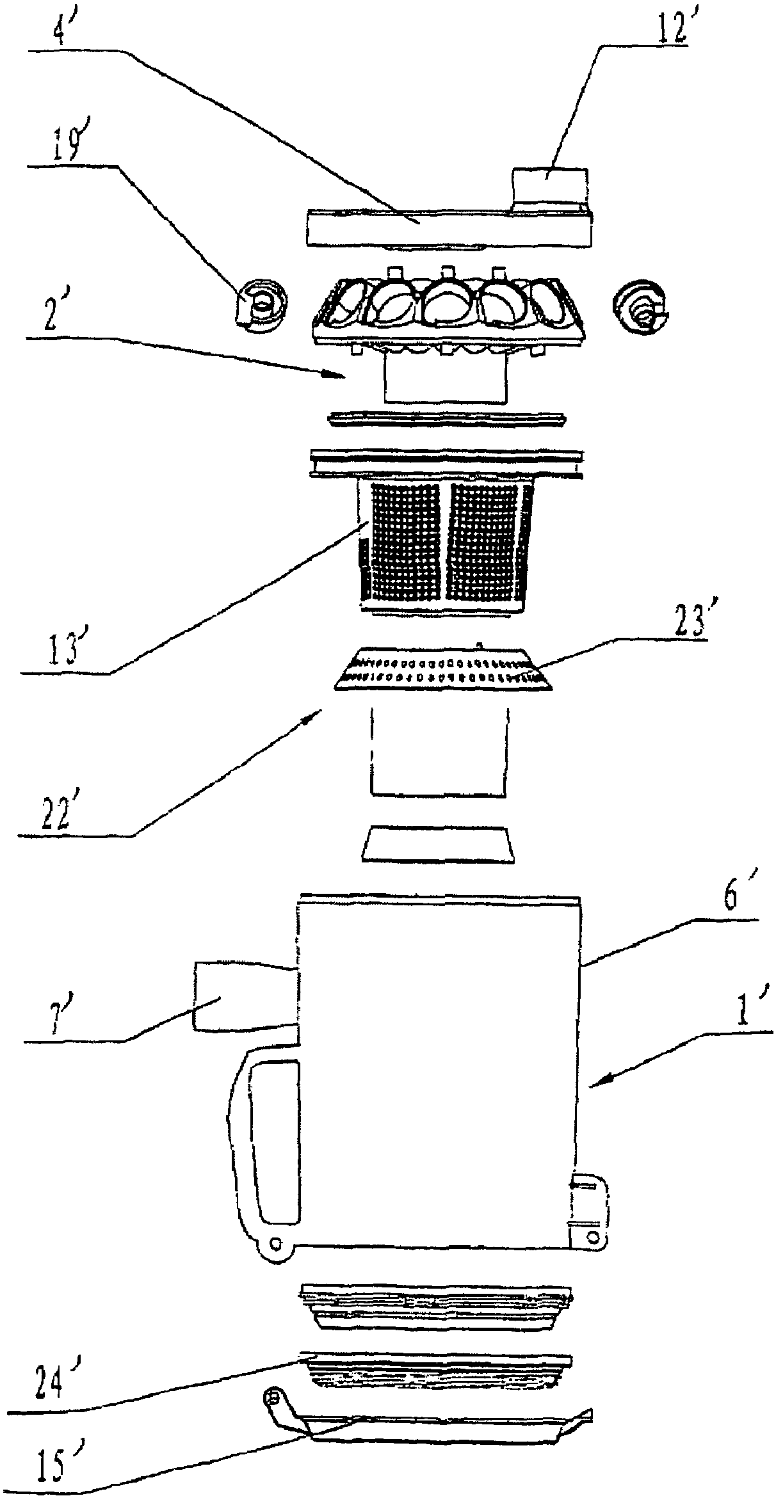
FIG. 6 is an explosive perspective view of the present invention according to another embodiment.
Figure 7:
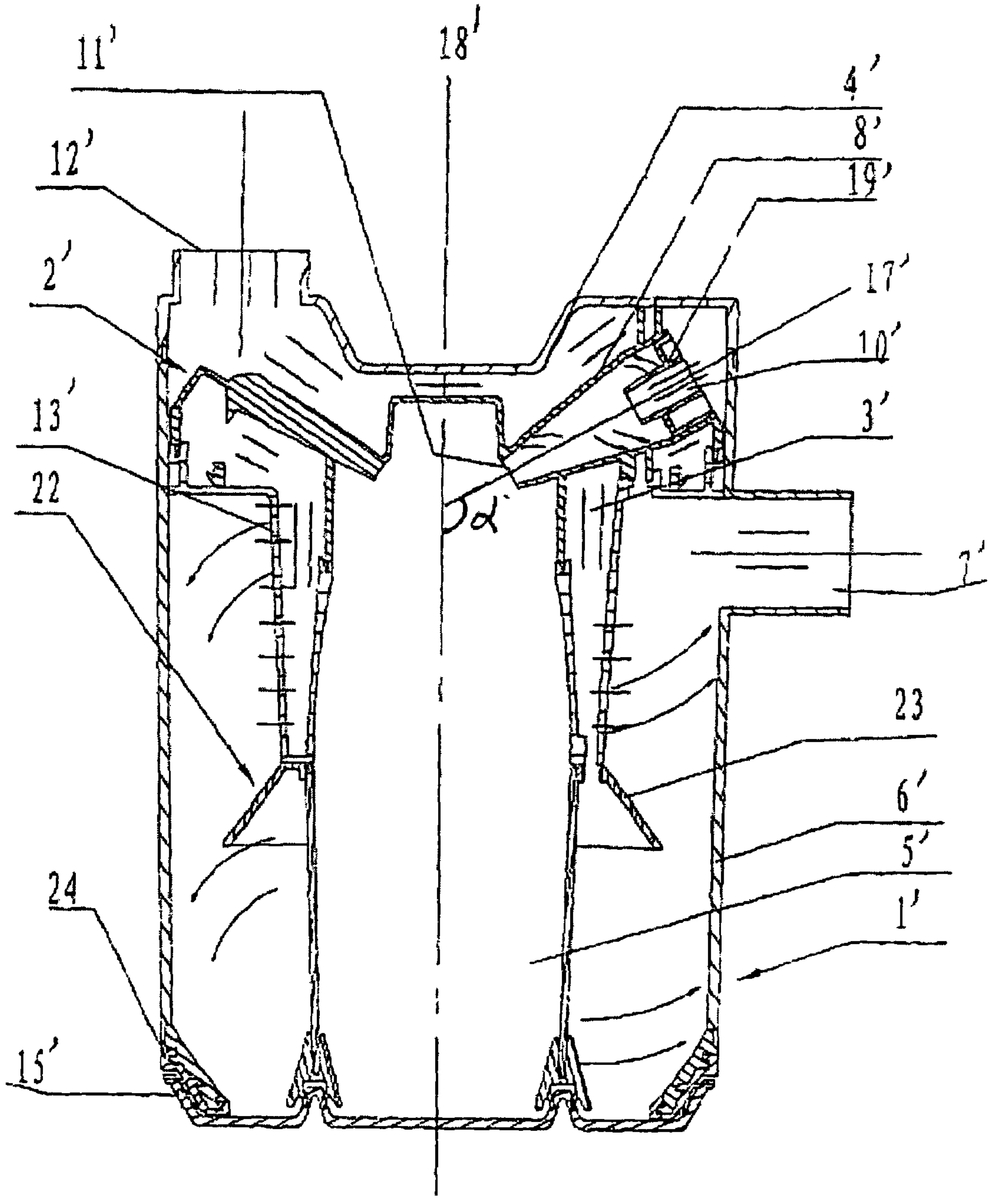
FIG. 7 is full sectional view of FIG. 6.

With reference to FIG. 6 and FIG. 7, the cyclone separating device according to this embodiment includes an upstream cyclone separating device 1' having a first cyclone barrel 6', a downstream cyclone separating device 2' having eight second cyclone barrels 8', and a gas passage 3' therebetween connecting the upstream cyclone separating device 1' and the downstream cyclone separating device 2' so that the two can communicate with each other. The downstream cyclone separating device 2' sleeps above the upstream cyclone separating device 1' in a half-lying manner, to be more specific, the downstream cyclone separating device 2' is half-lying while the angle α between the axis 17' of the second cyclone barrel 8' and the axis 18' of the first cyclone barrel 6' ranges from 15 to 165 degree.

The angle α is 135 degree here in this embodiment. The sidewall of the first cyclone barrel 6' is formed with a first suction mouth 7' through which the dust laden gas entering the first cyclone barrel 6' with a cylindrical or conical shaped filter mesh 13' coaxially set. The first suction mouth 7' is set tangentially to the inner sidewall of the first cyclone barrel 6', so that the gas enters the first suction mouth 7' in a tangential direction about the sidewall of the first cyclone barrel 6' to form a vortex inside the upstream cyclone separating device 1'. The filter mesh 13' is located at the center of the first cyclone barrel 6'. A dust barrel 5' can also be set inside the first cyclone barrel 6', the dust barrel 5' extending between the bottom of the upstream cyclone separating device 1' and the dust outlet 11 of the downstream cyclone separating device 2 and engages tightly with the inner sidewall of the filter mesh 13'. After passing through the filter mesh 13', the primarily purified gas further passes through the gas passage 3' and enters into the downstream cyclone separating device 2'. The outer surface of the dust barrel 5' is formed with a skirt brim 22 for intercepting the sundries like hair, hairy stuffs, etc, which then fall down to the first cyclone barrel 6', while the air with the relative smaller dust particles flows upward from the filtering pores 23' resulting in a good upstream separation.

The downstream separating device 2' further includes a leading conduit 19' having a gas outlet 10.

The second cyclone barrel 8' is formed with a gas outlet 11' above the dust barrel 5', the gas outlet 11' communicating with the dust barrel 5'. Posterior to flowing out of the gas passage 3', the gas flows into each second cyclone barrel 8', then the twice purified air passes through the cavity of the leading conduit 19' and finally vents out of the gas outlet 10 while the twice extracted dust fall into the dust barrel 5' through the dust outlet 11'.

The axle 17' of all the second cyclone barrels 8' intersect at one point, which is on the axis 18' of the first cyclone barrel 6'. With such design, the whole device achieves a small height.

The upside of the upstream separating device 1' can be detachably connected to a coping 4' with a gas outlet 12'. The purified air vented out from the second cyclone barrels 8' is conducted out of the cyclone separating device, and then was sucked into negative pressure source.

A bottom lid 15' is set at the underside of the upstream separating device 1', and a bottom sealed ring 24 set between the bottom lid 15' and the bottom of the first cyclone barrel 6' to achieve a better sealing effect.

What is claimed is:

1. A cyclone separating device of a cleaner, comprising:

an upstream cyclone separating device having a first cyclone barrel with a first axis; and a downstream cyclone separating device communicating with said upstream cyclone separating device through a gas passage, said downstream cyclone separating device having at least one second cyclone barrel with a second axis; wherein said downstream cyclone separating device is recumbently and wholly mounted above said upstream cyclone separating device and wherein the second axis of the at least one second cyclone barrel is substantially intersected at one point which is substantially on the first axis of said first cyclone barrel within the cyclone separating device.

2. The cyclone separating device of a cleaner according to claim 1, wherein the second axis of said second barrel is perpendicular to the first axis of said first barrel.

3. The cyclone separating device of a cleaner according to claim 1, wherein an angle between the first axis of said first barrel and the second axis of the second cyclone barrel is formed ranging from approximately 120 to 145 degrees.

4. The cyclone separating device of a cleaner according to claim 1, wherein said first cyclone barrel is formed with a first suction mouth in its sidewall and a filter mesh inside, said filter mesh being cylindrically or conically shaped and coaxial to said first cyclone barrel.

5. The cyclone separating device of a cleaner according to claim 1, wherein the downstream cyclone separating device includes at least two second cyclone barrels, wherein the axes of all second cyclone barrels are substantially coplanar.

6. The cyclone separating device of a cleaner according to claim 1, wherein the downstream cyclone separating device comprises a plurality of second cyclone barrels, wherein the second cyclone barrels are paratactic.

7. The cyclone separating device of a cleaner according to claim 1, wherein the downstream separating device includes at least two second cyclone barrels, wherein the second axes of all second cyclone barrels intersect at the first axis within the cyclone separating device.

8. The cyclone separating device of a cleaner according to claim 1, wherein between the first axis and the second axis a spatial angle is formed ranging from approximately 15 to 165 degrees.

9. The cyclone separating device of a cleaner according to claim 8, wherein said angle is in the range of approximately 20 to 160 degrees.

10. The cyclone separating device of a cleaner according to claim 1, wherein between the first axis and the second axis a spatial angle is formed ranging from approximately 75 to 125 degrees.

11. The cyclone separating device of a cleaner according to claim 10, wherein said angle is substantially 90 degrees.

12. The cyclone separating device of a cleaner according to claim 1, wherein a dust barrel is coaxially set inside said first cyclone barrel.

13. The cyclone separating device of a cleaner according to claim 12, wherein said second cyclone barrel is formed with a dust outlet communicating with said dust barrel.

14. The cyclone separating device of a cleaner according to claim 12, wherein inside of said first barrel is further mounted a skirt brim having a plurality of filter pores, said skirt brim being coaxial to said dust barrel and surrounding the outer surface of said dust barrel.

* * * * *